US010054702B2

(12) United States Patent
Yu et al.

(10) Patent No.: US 10,054,702 B2
(45) Date of Patent: Aug. 21, 2018

(54) METHOD TO ENHANCE THE RESOLVABILITY OF MOMENT TENSOR INVERSION FOR III CONDITIONED RECEIVER COVERAGE

(71) Applicant: Schlumberger Technology Corporation, Sugar Land, TX (US)

(72) Inventors: Xin Yu, Houston, TX (US); Walter Scott Leaney, Katy, TX (US); James T. Rutledge, Santa Fe, NM (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 14/919,731

(22) Filed: Oct. 22, 2015

(65) Prior Publication Data

US 2016/0116616 A1    Apr. 28, 2016

Related U.S. Application Data

(60) Provisional application No. 62/067,984, filed on Oct. 24, 2014.

(51) Int. Cl.
*G01V 1/40* (2006.01)
*G01V 1/28* (2006.01)
*G01V 1/00* (2006.01)

(52) U.S. Cl.
CPC .............. *G01V 1/288* (2013.01); *G01V 1/003* (2013.01); *G01V 2200/14* (2013.01); *G01V 2210/123* (2013.01); *G01V 2210/1234* (2013.01)

(58) Field of Classification Search
CPC .. G01V 1/288; G01V 1/003; G01V 2210/123; G01V 2210/1234; G01V 2200/14
USPC ...................................................... 367/25, 38
See application file for complete search history.

(56) References Cited

U.S. PATENT DOCUMENTS

| | | | | |
|---|---|---|---|---|
| 9,465,123 | B2* | 10/2016 | Lin | ......................... G01V 1/288 |
| 2012/0318500 | A1* | 12/2012 | Urbancic | ................. E21B 43/26 |
| | | | | 166/250.1 |
| 2015/0120198 | A1* | 4/2015 | Rebel | ....................... G01V 1/30 |
| | | | | 702/14 |

OTHER PUBLICATIONS

I.V. Rodriguez, et al, "Resolution of Seismic-Moment Tensor Inversions from a Single Array of Receivers," Bulletin of the Seismological Society of America, vol. 101, No. 6, pp. 2634-2642, Dec. 2011.
V. Vavrycuk, "On the retrieval of moment tensors from borehole data," Geophysical Prospecting, 2007, vol. 55, pp. 381-391.

* cited by examiner

*Primary Examiner* — Daniel L Murphy
(74) *Attorney, Agent, or Firm* — Sara K. M. Hinkley

(57) ABSTRACT

A technique facilitates enhanced microseismic monitoring. In a variety of applications, the technique may be used to enhance the resolvability of moment tensor inversion for ill-conditioned seismic receiver coverage. As a result, microseismic monitoring technique enhances the capability for monitoring many types of naturally occurring and created seismic events. For example, the technique may be employed to enhance hydraulic fracturing monitoring, induced seismicity monitoring, CO2 injection monitoring, other injection monitoring, mining, and/or other techniques which cause microseismic events.

14 Claims, 4 Drawing Sheets

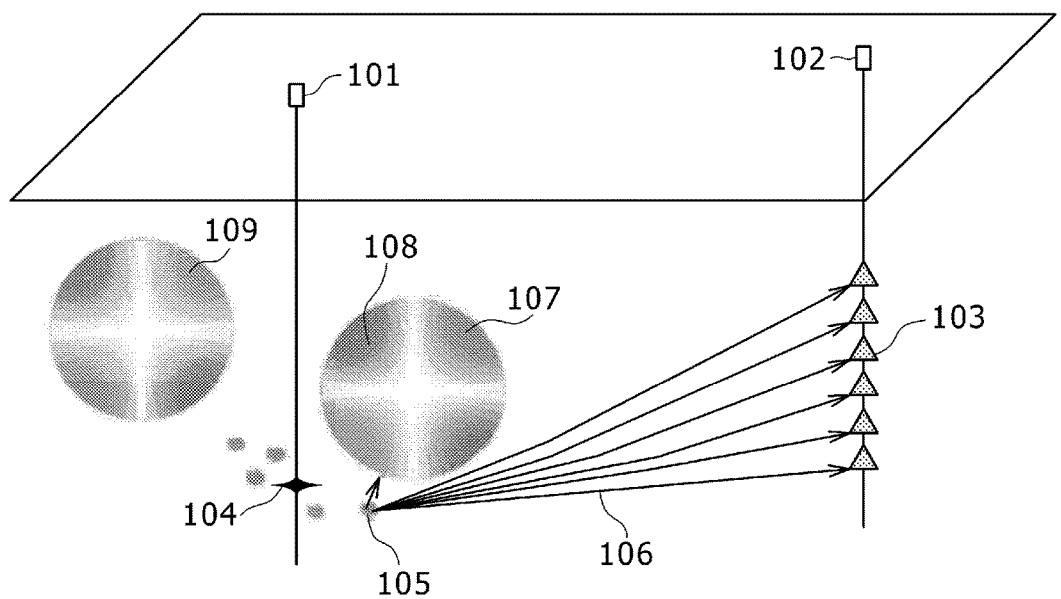
F I G . 1

Locations and the beach ball display

Locations and the fault plane solutions

Hockey-Puck display of the source mechanism

Unconstrained moment tensor inversion results

Normalized multi-event moment tensor inversion results

METHOD TO ENHANCE THE RESOLVABILITY OF MOMENT TENSOR INVERSION FOR ILL CONDITIONED RECEIVER COVERAGE

CROSS-REFERENCE TO RELATED APPLICATIONS

The present document is based on and claims priority to U.S. Provisional Application Ser. No. 62/067,984, titled "METHOD TO ENHANCE THE RESOLVABILITY OF MOMENT TENSOR INVERSION FOR ILL CONDITIONED RECEIVER COVERAGE", to Xin Y U et. al., filed Oct. 24, 2014, which is incorporated herein by reference in its entirety.

BACKGROUND

Subterranean exploration has produced a variety of methods and techniques useful to scientific and commercial interests. Analyzing microseismic signals produced during the fracturing or movement of geological features and layers can provide a three-dimensional indication of the activity and surrounding composition of a region of interest. The analysis of microseismic signals can be used to facilitate the detection and production of hydrocarbon fluids. Hydrocarbon fluids such as oil and natural gas are obtained from a subterranean geologic formation, referred to as a reservoir, by drilling a well that penetrates the hydrocarbon-bearing formation. Hydraulic fracturing of the subterranean geologic formation can increase the production and effectiveness of a reservoir. Monitoring microseismic signals produced during hydraulic fracturing can aid well operators in determining the extent and direction of the produced fractures.

SUMMARY

In general, a methodology and system are described for providing enhanced microseismic monitoring. The system and methodology may be used to enhance the resolvability of moment tensor inversion for ill-conditioned seismic receiver coverage. As a result, the microseismic monitoring technique enables enhanced monitoring of many types of naturally occurring and created seismic events. For example, the technique may be employed to enhance hydraulic fracturing monitoring, induced seismicity monitoring, CO2 injection monitoring, other injection monitoring, mining, and/or other techniques which cause microseismic events.

However, many modifications are possible without materially departing from the teachings of this disclosure. Accordingly, such modifications are intended to be included within the scope of this disclosure as defined in the claims.

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein, and:

FIG. 1 is a schematic illustration of an example of a monitoring geometry, according to an embodiment of the disclosure;

DETAILED DESCRIPTION

Figure 2:
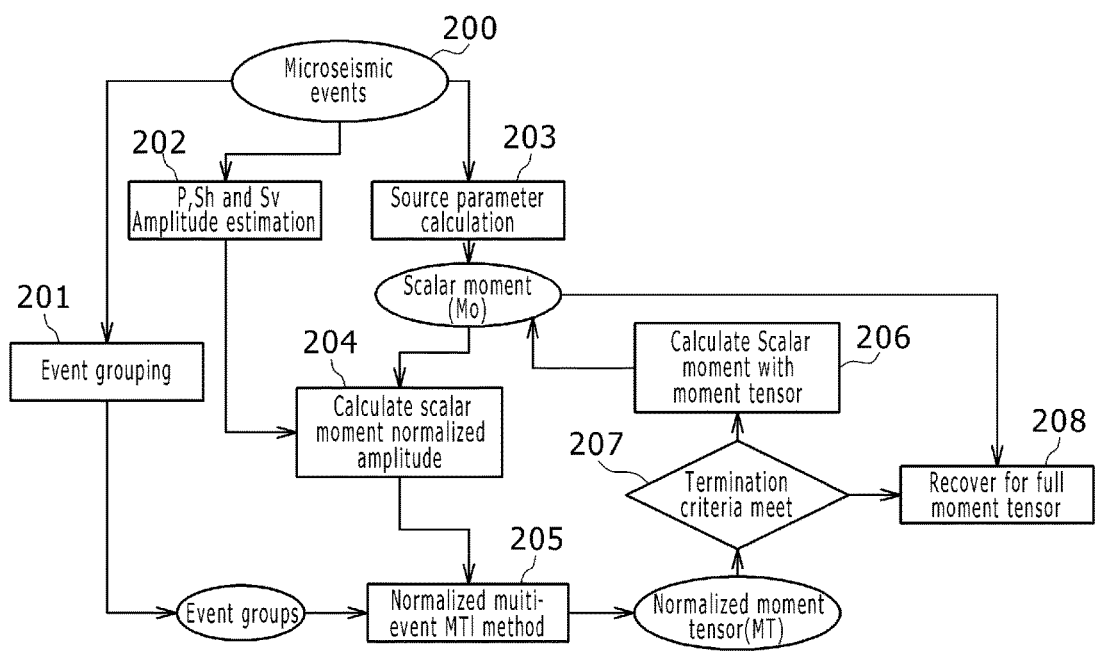
FIG. 2 is a flowchart illustrating an example of a methodology to enhance resolvability of moment tensor inversion, according to an embodiment of the disclosure.

In the following description, numerous details are set forth to provide an understanding of some embodiments of the present disclosure. However, it will be understood by those of ordinary skill in the art that the system and/or methodology may be practiced without these details and that numerous variations or modifications from the described embodiments may be possible.

Embodiments described herein facilitate enhanced microseismic monitoring in a variety of applications. As described in greater detail below, a system and methodology may be applied to source mechanism identification under, for example, ill-conditioned receiver coverage to enhance the resolvability for microseismic monitoring. The microseismic monitoring may be used in many applications in which microseismic events occur. Examples of such applications include hydraulic fracturing monitoring, induced seismicity monitoring (ISM), CO2 injection monitoring, other injection monitoring, mining, and/or other applications causing microseismic events. In some applications, the enhanced microseismic monitoring may be used for evaluating naturally occurring microseismic events. Microseismic source events create seismic wave fields which propagate through the earth, e.g. through isotropic formations, and have wave components including a P-wave component and two shear wave components, Sh and Sv.

The various techniques described herein may be utilized to facilitate and improve data acquisition and analysis in downhole tools and systems. In various applications, downhole tools and systems utilize arrays of sensing devices that are configured or designed for easy attachment and detachment in downhole sensor tools or modules that are deployed for purposes of sensing data related to environmental and tool parameters downhole, e.g. within a borehole. The tools and sensing systems, e.g. receiver arrays and data processing systems, disclosed herein may effectively sense and store characteristics related to components of downhole tools as well as formation parameters at various conditions, e.g. elevated temperatures and pressures. The sensing systems herein may be incorporated in tool systems such as wireline logging tools, measurement-while-drilling (MWD) and logging-while-drilling (LWD) tools, permanent monitoring systems, drill bits, drill collars, sondes, and other tool systems.

For purposes of this disclosure, it should be understood that the description may be applied to many types of these tool systems.

The various techniques described herein may be utilized to facilitate and improve data acquisition and analysis regarding data obtained by the downhole tools and systems. In various applications, the downhole tools and systems utilize seismic receiver arrays deployed for sensing seismic data related to environmental conditions, e.g. the presence of hydrocarbons. The sensing and data processing techniques disclosed herein may be conducted on a processing system, e.g. a computer-based processing system, to effectively improve the usefulness of the seismic data.

Moment tensor inversion (MTI) can be used to identify the source mechanisms of seismic activities of Earth formation deformation. The formation deformation can result from structural activities such as faulting of the crust and volcanic activities as well as human-induced microseismic events such as seismicity or micro-seismicity caused by hydraulic fracturing, reservoir production, CO2 or water injection, and mining. The source mechanisms of these formation deformation activities can be used to help understand the fracture/fault generation processes and the stress profile of the formation. In the oil and gas industry, for example, understanding the source mechanisms associated with hydraulic fracturing and reservoir production can be useful with respect to post job evaluation, production prediction, and reservoir management. This understanding may be especially helpful with respect to unconventional reserves such as shale gas reserves under which more complicated fracture networks have been observed.

To recover seismic source mechanisms of an induced seismicity, good sampling is utilized with respect to the focal sphere of the seismic source or by ensuring sufficient seismic receiver coverage. Several studies (e.g. Vavryčuk 2007 and Rodriguez, Gu and Sacchi December 2011) pointed out that just five out of six elements of the moment tensor can be inverted from the single well monitoring configuration with a straight wellbore trajectory, including straight vertical and deviated wells. Although it may be possible to invert for the six elements of the moment tensor for a deviated single well, as pointed out by Vavryčuk 2007 and Rodriguez, Gu and Sacchi December 2011, the inversion becomes unstable and noises are increased resulting in a high degree of uncertainty. Most of the hydraulic fracturing monitoring jobs use one monitoring well and this does not meet the minimum desired focal sphere coverage. According to embodiments described herein, however, methods may be used to enhance the resolvability of the source mechanism when receiver coverage does not satisfy the minimum requirement.

An aspect of the resolvability of the moment tensor inversion is the sampling coverage of each receiver projected to a focal sphere. The receiver coverage can be improved by using multiple events from different locations. Referring generally to FIG. 1, an example of an ill-conditioned microseismic monitoring geometry is illustrated with a single monitoring well. In this example, a treatment well 101 and a monitoring well 102 are illustrated. A plurality of seismic receivers 103 is disposed along the monitoring well 102 for receiving seismic signals resulting from seismic events, e.g. microseismic events associated with hydraulic fracturing.

During a hydraulic fracturing application, a hydraulic fracturing treatment delivers fracturing fluid through perforations into the fractures 104 of treatment well 101. The hydraulic fracturing treatment generates at least one microseismic source 105 which provides seismic signals 106 to receivers 103. The receivers 103 of monitoring well 102 are projected back to a focal sphere 107 of the microseismic source 105 at locations 108. The locations 108 of the receivers 103 projected back to the focal sphere 107 represent the receiver coverage for moment tensor inversion. For a single seismic event example, the receiver coverage may be poor due to the locations 108 of the receivers 103 being projected back to the focal sphere 107 on a line. In this situation 5 out of 6 elements of the moment tensor can be resolved. However, if multiple events, distributed in a comparably large space with the same or very close source mechanisms, are considered, the complete moment tensor can be solved by effectively enhancing the receiver coverage as represented by sphere 109.

A normalized multi-event moment tensor inversion (ME-MTI) may be employed as described below. When the source-receiver distance is much larger than the source scale, the seismic source can be considered as the point source and represented by its moment tensor, which is a 3 by 3 matrix. Displacement at the receiver $\vec{x}_r$ with moment tensor source $\hat{M}$ at location $\vec{x}_s$ can be written as:

$$\vec{u}(\vec{x}_r, t: \vec{x}_s) = \sum_{rays} \hat{G}_{ray}(\vec{x}_r, t: \vec{x}_s) : * \hat{M} \frac{\partial M(t)}{\partial t} \tag{1}$$

where $\hat{G}_{ray}(\vec{x}_r, t:\vec{x}_s)$ is the Green's function for a ray from source $\vec{x}_s$ to receiver $\vec{x}_r$, M(t) is the source function, and $\hat{M}$ is the normalized moment tensor of the source.

$\hat{G}_{ray}(\vec{x}_r, t:\vec{x}_s)$ can be written as:

$$\hat{G}_{ray}(\vec{x}_r, t:\vec{x}_s) = G_{ray}(\vec{x}_r, t:\vec{x}_s)\hat{g}_r^{ray} E_s^{ray} \tag{2}$$

where $\hat{g}_r^{ray}$ is the polarization vector for the ray path at the receiver. $E_s^{ray}$ is the second-order ray strain tensor at the source which can be described as $E_s = (\hat{g}_s\hat{p}_s^T + \hat{p}_s\hat{g}_s^T)/2$. In this example, $\hat{g}_s$ is the unit polarization vector and $\hat{p}_s$ is the unit phase slowness vector at the source. Equation (1) can thus be written as:

$$d^i = G^i : *M^i \tag{3}.$$

This latter equation defines a linear relationship between the moment tensor at the source and the displacements observed at each receiver 103. If the displacement is known at each receiver 103 and the Green's function is known from the source location to each receiver 103, the moment tensor can be inverted at the source using equation (3). In many monitoring geometries for hydraulic fracturing monitoring, the receiver coverage is insufficient to solve the moment tensor due to the under-determined problem or the condition number of $G^i$ being very high. This can cause the inversion to be unstable.

In most cases of hydraulic fracturing, the hydraulic induced microseismic events can be categorized into several groups. In each group, microseismic events show very similar source mechanisms with different scales and locations. It makes sense that these events are generated from the similar stress profile and under the same injection treatment, or that the events are activated from the same large natural fault under similar pore pressure changes. This indicates that it is possible to use the events with the similar source mechanism together to enhance the resolvability of moment tensor inversion.

The moment tensor of event i can be decomposed as equation (4)

$$M^i = M_0^i \left[ ISO \cdot I + (1 - |ISO|) \cdot \left( \hat{n}\hat{d}^T + \hat{d}\hat{n}^T \right) \right] \quad (4)$$
$$= M_0^i \hat{M}$$

where $M_0^i$ is the scalar moment of event i, which is varied among the events, ISO is the fraction of the isotropic component, n̂ is the unit normal vector of the fault plane, and d̂ is the unit displacement vector of the source. ISO is positive when representing expansion event and negative when representing contraction event. $\hat{M}$ is the common part of the source mechanism for the entire number of events and provides the parameters targeted to be inverted. Thus there are N+5 unknown parameters to be inverted which are the N scalar moments for each event and 5 parameters for the common moment tensor (or normalized moment tensor). To solve N+5 parameters is a non-linear problem and if the scalar moment can be estimated for each event using other methods, the unknowns can be reduced to 5. This makes the problem a linear inversion problem.

Substituting equation (4) into equation (3), results in equation (5):

$$d^i = M_0^i G^i : *\hat{M} \quad (5)$$

which can be rewritten as:

$$\frac{1}{M_0^i} d^i = G^i : *\hat{M} \quad (6)$$

The left side of the equation (6) is the normalized displacement and $\hat{M}$ is the normalized moment tensor. If the events in the event group have the same or very close source mechanism, just one normalized moment tensor can be found to represent the entire number of source mechanisms for the entire number of events in this group. In other words, equation (6) provides a method to invert for the centroid source mechanism for multiple events and it is a linear inversion problem. As illustrated by FIG. 1, the simultaneous multi-event inversion can increase the effective receiver coverage and enhance the resolvability for moment tensor inversion.

Referring generally to FIG. 2, a flowchart is provided which shows an embodiment of a workflow for applying equation (6) to multi-event moment tensor inversion. The input of the workflow is the microseismic events data 200 with full waveform, event locations, time pickings for P, Sh and Sv, and origin time (T0). An event grouping algorithm (see workflow block 201) may be run to group the events into several event groups. In each event group, the seismic events have the same or similar source mechanism. A suitable algorithm designed to group events based on the event source mechanism similarities can be used to group the events.

The microseismic event data 200 also may be used to estimate the amplitudes for P, Sh and Sv phases as normal single event moment tensor inversion does. The absolute amplitudes for each event can be output as represented by workflow block 202. On the other hand, the scalar moment estimation may be determined from the microseismic event data 200 using the existing source parameter estimation algorithm and the estimated scalar moment for each event may be output, as represented by workflow block 203, using equation (7):

$$M_0 = \frac{4\pi\rho c^3 R \Omega_0}{F_c R_c S_c} \quad (7)$$

where ρ is the density at the source, c is the velocity of the wave propagation, R is the ray length from the source to the receiver, $\Omega_0$ is the signal moment estimated from the low frequency end of the displacement spectrum, $F_c$ is the radiation coefficient related to the source mechanism, $R_c$ is the receiver response function, and $S_c$ is the free surface response function near the receiver.

Due to the source mechanisms being unknown, the radiation coefficient is selected as the averaging of the whole focal sphere for the first iteration. The absolute amplitudes may be normalized by the scalar moment for each event, as illustrated in workflow block 204. The normalized amplitudes may then be used as the input for the event group for multi-event moment tensor inversion to resolve the normalized moment tensor, as represented by workflow block 205, using equation (6). In this example, the normalized centroid moment tensor of the event group is used to refine the scalar moment by applying the radiation coefficient calculated from the common moment tensor, as illustrated by workflow block 206.

The updated scalar moment may be used to estimate the normalized amplitude in workflow block 204, and the normalized multi-event moment tensor inversion may be re-run, as represented by workflow block 205. The iteration may be repeated until the termination criteria are met, as represented by workflow block 207. In this example, the criteria are the maximum iteration number and the norm of the difference of the common moment tensor between the last two iterations. The refined scalar moment in the last iteration may then be used to recover the full moment tensor for each event by multiplying it by the normalized centroid moment tensor, as represented by workflow block 208.

Figure 3:
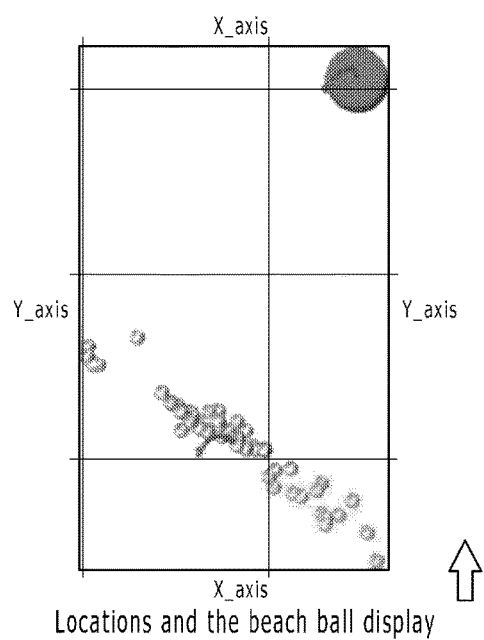
FIG. 3 is a graphical illustration of an example of synthetic data for a test showing locations providing a "beach ball" display of seismic events, according to an embodiment of the disclosure.
Figure 4:
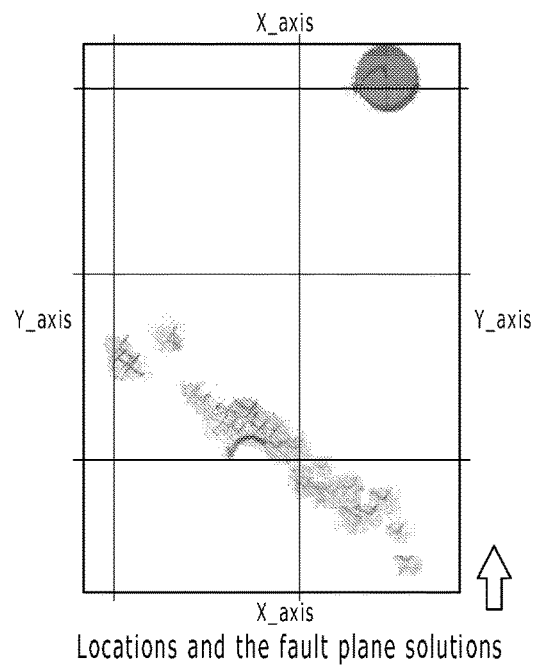
FIG. 4 is a graphical illustration of an example of synthetic data for a test showing fault plane solutions, according to an embodiment of the disclosure.
Figure 5:
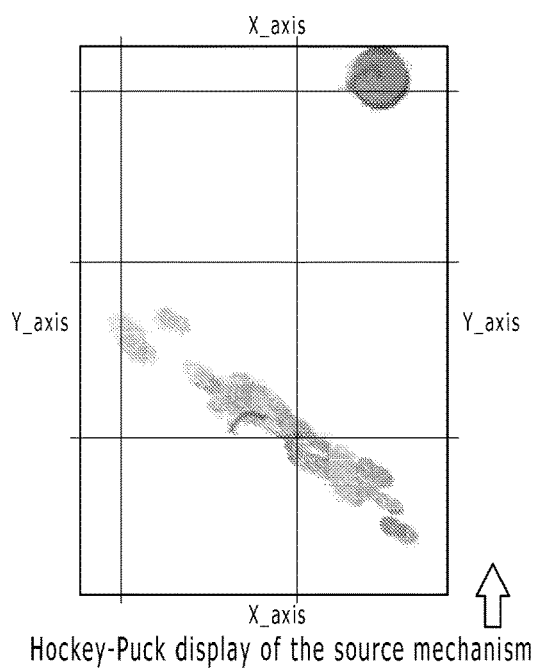
FIG. 5 is a graphical illustration of an example of synthetic data for a test showing locations providing a "hockey-puck" display of seismic source mechanisms, according to an embodiment of the disclosure.

Referring generally to FIGS. 3 through 5, an example of synthetic data for a test is illustrated. In this example, there are 58 double couple events with centroid source mechanisms defined by a strike −50 degree, dip 45 degree, and rake 0 degree. The distribution of the strike, dip and rake is within ±3 degrees. The scalar moments of these events varied from 1.68 e6 lbf·ft to 1.08 e8 lbf·ft.

Figure 6:
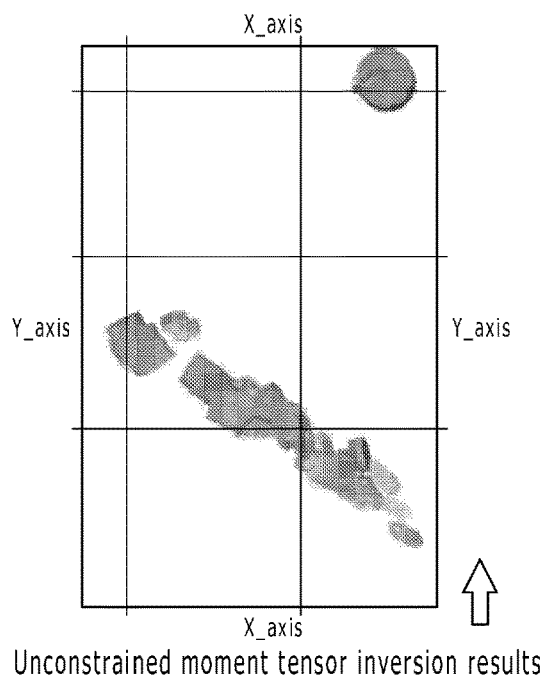
FIG. 6 is a graphical illustration representing unconstrained moment tensor inversion results, according to an embodiment of the disclosure.

In this particular example, FIG. 3 illustrates a "beach ball" display representing the seismic events. FIG. 4 illustrates fault plane solutions, and FIG. 5 illustrates a "hockey-puck" display representing the source mechanisms. Synthetic waveforms may be generated using Brune's source function with ray based Green's function for the plurality of receivers 103, e.g. 20 geophones, placed in an offset well as illustrated by the round disk in the upper right hand corner of FIGS. 3-5. Because of the near vertical straight well trajectory, there is no good receiver coverage. Consequently it is not possible to stably invert for the whole moment tensor in this situation for a single event MTI. In this example, the condition numbers for the seismic events are scattered from 660 to 1246. As FIG. 6 illustrates, the moment tensor inversion results are unconstrained and biased compared to the real moment tensor for each event if a single event MTI method is applied.

Figure 7:
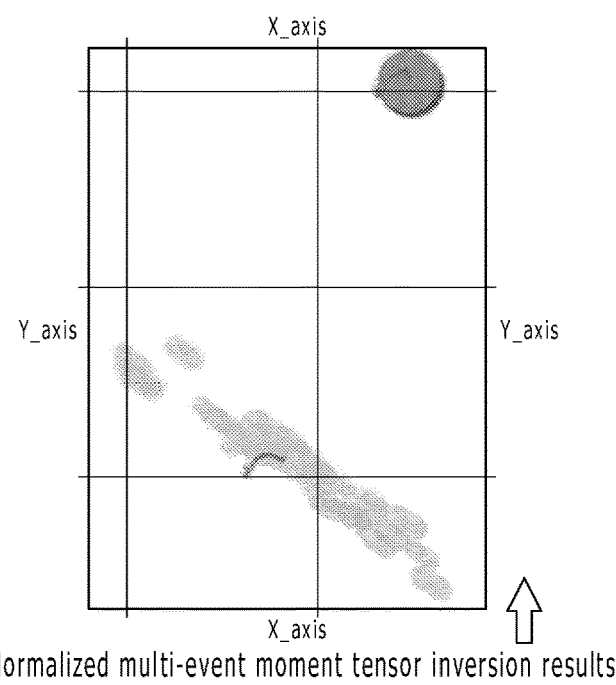
FIG. 7 is a graphical illustration representing normalized multi-event moment tensor inversion results, according to an embodiment of the disclosure.

In FIG. 7, the results from the normalized ME-MTI method are illustrated. In this example, the centroid moment tensor matches the synthetic data as illustrated. Additionally, the source parameters also are shown in the Table below.

TABLE

| | ME-MTI result | | | | |
|---|---|---|---|---|---|
| | Strike (deg) | Dip (deg) | Rake (deg) | Opening angle (deg) | Isotropic (ISO) fraction |
| Real MT | −50 ± 3 | 45 ± 3 | 0 ± 3 | 0 ± 3 | 0 |
| ME-MTI | −52 | 46.8 | 2 | −2.88 | 0.02 |

Furthermore, the condition number reduces to 7.24 by the ME-MTI which provides a good constraint to the inversion.

It should be noted the various calculations and the data processing described above may be performed on a suitable processing system, such as a computer-based processing system. The data processing system may be located at a surface location proximate the monitoring well or at any other suitable locations. For example, data obtained from the array of receivers 103 may be sent to a remote location for processing on one or more computer-based processing systems to obtain the desired output data regarding the enhanced resolvability of microseismic monitoring.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:

1. A method to enhance seismic receiver coverage, comprising:
   obtaining data on seismic events via a plurality of seismic receivers;
   grouping the seismic events into a plurality of event groups with each event group having the same or similar source mechanisms;
   using the data to estimate amplitudes for P, Sh, and Sv phases of a seismic waveform and outputting absolute amplitudes for each seismic event;
   estimating a scalar moment for each seismic event based on the data and outputting an estimated scalar moment for each seismic event;
   normalizing the absolute amplitudes by the scalar moment for each seismic event and using the absolute amplitudes for the event group for multi-event moment tensor inversion to resolve a normalized moment tensor;
   refining the scalar moment by applying a radiation coefficient calculated from a common moment tensor resulting from resolving the normalized moment tensor to provide an updated scalar moment;
   determining a normalized amplitude based on the updated scalar moment and re-running the normalizing to resolve the normalized moment tensor for a plurality of iterations to obtain a final refined scalar moment;
   using the final refined scalar moment to recover the full moment tensor for each seismic event by multiplying the refined scalar moment by a normalized centroid moment tensor; and
   providing an enhanced seismic receiver coverage based on recovery of the full moment tensor for each seismic event.

2. The method as recited in claim 1, wherein estimating comprises outputting the estimated scalar moment by using the equation:

$$M_0 = \frac{4\pi\rho c^3 R \Omega_0}{F_c R_c S_c}$$

where $\rho$ is the density at the seismic event source, c is the velocity of the wave propagation, R is the ray length from the seismic event source to the receiver, $\Omega_0$ is the signal moment estimated from the low frequency end of the displacement spectrum, $F_c$ is the radiation coefficient related to the seismic event source mechanism, $R_c$ is the seismic receiver response function, and $S_c$ is the free surface response function near each seismic receiver.

3. The method as recited in claim 1, wherein determining comprises repeating the iterations until termination criteria are met.

4. The method as recited in claim 3, further comprising selecting the termination criteria as the maximum iteration number and the norm of the difference of the common moment tensor between the last two iterations.

5. The method as recited in claim 1, wherein obtaining data on seismic events via a plurality of seismic receivers comprises using the plurality of seismic receivers in hydraulic fracturing monitoring.

6. The method as recited in claim 1, wherein obtaining data on seismic events via a plurality of seismic receivers comprises using the plurality of seismic receivers in reservoir production monitoring.

7. The method as recited in claim 1, wherein obtaining data on seismic events via a plurality of seismic receivers comprises using the plurality of seismic receivers in CO2 injection monitoring.

8. The method as recited in claim 1, wherein obtaining data on seismic events via a plurality of seismic receivers comprises using the plurality of seismic receivers in water injection monitoring.

9. The method as recited in claim 1, wherein obtaining data on seismic events via a plurality of seismic receivers comprises using the plurality of seismic receivers in monitoring of a mining operation.

10. A method to enhance seismic receiver coverage, comprising:
    arranging a plurality of seismic receivers to monitor microseismic events;
    grouping the microseismic events into event groups;
    calculating scalar moment normalized amplitudes of waveforms resulting from the microseismic events;
    using the event groups and the scalar moment normalized amplitudes for establishing a normalized moment tensor;
    repeating the calculating of scalar moment normalized amplitudes and the establishing of a normalized moment tensor until termination criteria are met; recovering a full moment tensor; and
    improving coverage of the plurality of seismic receivers by applying the full moment tensor.

11. The method as recited in claim 10, wherein arranging a plurality of seismic receivers to monitor microseismic events comprises using further comprising using the plurality of seismic receivers in hydraulic fracturing monitoring.

12. The method as recited in claim 10, wherein arranging a plurality of seismic receivers to monitor microseismic events comprises using the plurality of seismic receivers in reservoir production monitoring.

13. The method as recited in claim 10, wherein arranging a plurality of seismic receivers to monitor microseismic events comprises using the plurality of seismic receivers in CO2 injection monitoring.

14. The method as recited in claim 10, wherein arranging a plurality of seismic receivers to monitor microseismic events comprises using the plurality of seismic receivers in water injection monitoring.

* * * * *